UNITED STATES PATENT OFFICE 2,517,335

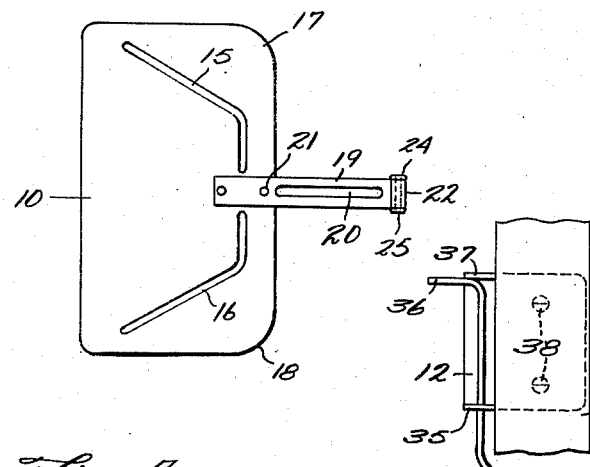
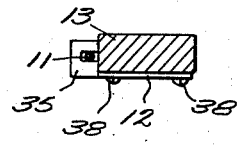
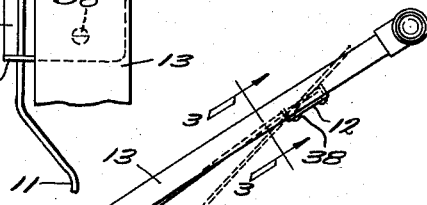
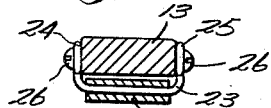
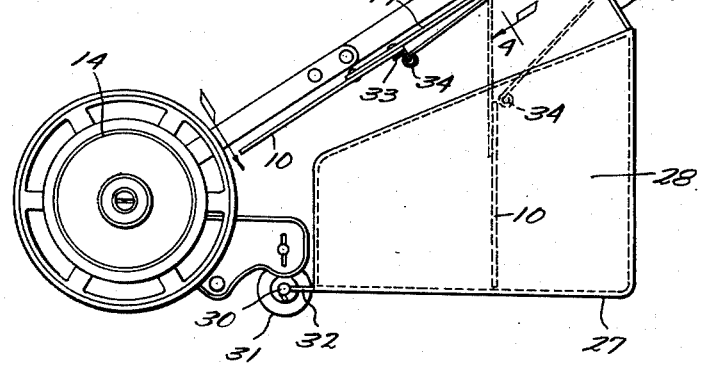

LAWN MOWER GRASS COMPRESSOR

Guy Muzzy, Oakland, Calif., assignor of one-half to Orpha V. Wible, Erie, Pa.

Application March 16, 1948, Serial No. 15,227

1 Claim. (Cl. 56—199)

This invention relates to attachments for lawn mowers that are provided with hoppers for catching and carrying grass as it is cut, and in particular a blade pivotally attached to the under side of the handle of a lawn mower, positioned to enter a hopper suspended behind the mower and compress grass caught therein, and a lever for actuating the blade from a point adjacent the end of the handle of the mower and also for locking the blade upward against the under side of the handle. The purpose of this invention is to provide means for moving cut grass in a hopper attached to a lawn mower toward the rear of the hopper and compressing the grass therein while the mower is in operation.

Various types of grass collecting hoppers have been provided for lawn mowers and whereas these carry a small amount of grass they are not used universally because the grass piles or accumulates directly behind the cutting blades and if the hopper is made relatively large it is necessary to stop the mower and move the grass toward the rear of the hopper at frequent intervals. With this thought in mind this invention contemplates a device for moving and compressing the grass in the rear of a grass receiving hopper attached to a lawn mower while the mower is in use.

The object of this invention is, therefore to provide an attachment that may readily be mounted on the under side of a handle of a lawn mower that may be acuated from the outer end of the handle to push grass cut by the mower backward in a hopper positioned behind the cutting blades and under the handle of the mower.

Another object of the invention is to provide an attachment for compressing cut grass in the rear portions of hoppers suspended behind the cutting blades of lawn mowers that may be installed on mowers now in use.

A further object of the invention is to provide a grass compressing attachment for grass receiving hoppers of lawn mowers which is of a simple and economical construction.

With these and other objects and advantages in view the invention consists of the new and novel combination, construction, and arrangement of parts as hereinafter more fully described, set forth in the claim appended hereto, and disclosed in the accompanying drawings forming part hereof, wherein:

Figure 1 is a view showing a side elevation of a lawn mower with the grass compressing blade attached to the under side of the handle and with a grass collecting hopper positioned behind the cutting blades.

Figure 2 is a plan view of the compressor blade with the mounting strap thereon and with the other parts omitted.

Figure 3 is a cross section through the handle of the mower taken on line 3—3 of Figure 1.

Figure 4 is also a cross section through the handle of the mower taken on line 4—4 of Figure 1, showing the pivotal mounting of the blade on the handle of the mower.

Figure 5 is a detail showing a latch for holding the upper end of the blade control rod.

Referring now to the drawings wherein like reference characters denote corresponding parts the compressor blade for lawn mower grass receiving hoppers of this invention includes a blade 10, an actuator rod 11, and a latch 12, and the blade is positioned on the under side of a handle 13 of a lawn mower 14.

The blade 10 is formed of a rectangular-shaped plate having ribs or corrugations 15 and 16 therein to reinforce the intermediate portions thereof and the lower corners are substantially square whereas the plate is provided with arcuate upper corners 17 and 18. A strap 19 with a reinforcing rib 20 therein is attached to the blade 10 by rivets 21 and the upper end of the strap is rolled to form a hub 22 by which the blade is pivotally attached to the handle 13 by a clevis 23 which has eyes 24 and 25 at the ends. The clevis is attached to the handle by screws 26, as shown in Figure 4, and the pivotal mounting is positioned so that the lower edge of the plate or blade 10 will just clear the upper surface of the bottom 27 of a grass receiving hopper 28, which is suspended from the handle 13 by rods 29 with the lower edge thereof held on the shaft 30 of the roller 31 by hooks 32.

A clip 33 is positioned in the center of the upper edge of the blade 10 and the actuator rod 11 is connected thereto through an eye 34 at the end of the rod. The upper end of the rod 11 is slidably held in an opening through a flange 35 on the lower side of the latch 12, and the end 36 of the rod, which extends outwardly, is positioned to engage a flange 37 on the upper side of the latch, as shown in Figure 5, to hold the rod downward with the blade 10 against the under surface of the handle, as shown in Figure 1. The latch 12 is secured on the under surface of the handle by screws 38.

With the parts arranged in this manner the blade 10 is normally held against the under surface of the lawn mower handle by the actuator rod 11 with the upper end thereof held by the latch member 12, and when it is desired to move grass back in the hopper the end 36 of the rod 11 is sprung upward over the flange 37, and with this end used as a handle the blade may be pulled backward as indicated by the dotted lines in Figure 1, so that the cut grass may be moved away from the cutting blades and compressed in the back of the hopper. The parts may be made of any suitable material and the sizes thereof may be varied so that the device may be used on substantially any type of mower.

It will be understood that modifications may be made in the design or arrangement of the parts without departing from the spirit of the invention.

What is claimed is:

In a cut grass attachment for a lawn mower having a handle and a spacing roller, the combination which comprises a grass receiving hopper positioned behind the mower with the forward lower edge carried by the spacing roller mounting and with the rear portion suspended by a wire bail from the handle, a rectangular shaped blade having reinforcing ribs therein and having a centrally disposed strap with a reinforcing rib therein extended from the upper edge, a clevis having a round rod positioned below and extended across the lower surface of the handle with the ends of the rod secured to the sides of the handle by screws, said strap of the blade having a rolled upper end positioned around the round rod of the clevis for suspending the blade in the hopper, a latch comprising a plate secured to the lower surface of the handle and spaced from the end thereof, said plate having an extended end with spaced upwardly extended upper and lower flanges thereon and said lower flange having an opening therethrough, and a rod slidably mounted in the opening in the lower flange of the latch with the lower end of the rod pivotally attached to the upper edge of the blade and with the upper end of the rod extended outwardly providing a handle, said handle positioned to engage the upper flange of the latch to retain the rod in the position of holding the blade against the under surface of the handle.

GUY MUZZY.

REFERENCES CITED

The following references are of record in the file of this patent:

UNITED STATES PATENTS

| Number | Name | Date |
|---|---|---|
| 1,588,148 | Schryver | June 8, 1926 |
| 2,067,916 | Haffner | Jan. 19, 1937 |
| 2,430,912 | Christian | Nov. 18, 1947 |
| 2,440,934 | De Vol | May 4, 1948 |